(12) United States Patent
Whelan

(10) Patent No.: US 9,371,202 B2
(45) Date of Patent: Jun. 21, 2016

(54) DOCK RAMP ASSEMBLY

(71) Applicant: MCR Consortium Limited, Dublin (IE)

(72) Inventor: Francis Whelan, Foulksmills (IE)

(73) Assignee: MCR Consortium Limited, Dublin (IE)

( * ) Notice: Subject to any disclaimer, the term of this patent is extended or adjusted under 35 U.S.C. 154(b) by 0 days.

(21) Appl. No.: 14/378,177

(22) PCT Filed: Feb. 13, 2013

(86) PCT No.: PCT/EP2013/052906
§ 371 (c)(1),
(2) Date: Aug. 12, 2014

(87) PCT Pub. No.: WO2013/120914
PCT Pub. Date: Aug. 22, 2013

(65) Prior Publication Data
US 2015/0000211 A1    Jan. 1, 2015

(30) Foreign Application Priority Data

Feb. 13, 2012 (GB) .................................. 1202443.6
Feb. 13, 2012 (IE) .................................... 2012/0076
Feb. 13, 2012 (IE) .................................... S2012/0075

(51) Int. Cl.
*B65G 69/00* (2006.01)
*B65G 69/28* (2006.01)

(52) U.S. Cl.
CPC .......... *B65G 69/2864* (2013.01); *B65G 69/001* (2013.01); *B65G 69/008* (2013.01)

(58) Field of Classification Search
CPC ............ B65G 69/001; B65G 69/2876; B05B 15/1211; B05B 15/1214
USPC ................ 52/173.2, 2.12; 14/71.1, 71.3, 69.5
See application file for complete search history.

(56) References Cited

U.S. PATENT DOCUMENTS 3,303,615 A * 2/1967 O'Neal ........................ 52/2.13
4,349,992 A * 9/1982 Layne ........................ 52/173.2
(Continued)

FOREIGN PATENT DOCUMENTS

CA    2630439 A1    11/2008
EP    2380833 A1    8/1991
(Continued)

OTHER PUBLICATIONS

PCT International Search Report regarding Application No. PCT/EP2013/052906 filed Feb. 13, 2013, a related application to U.S. Appl. No. 14/378,177.

*Primary Examiner* — Rodney Mintz
*Assistant Examiner* — Daniel Kenny
(74) *Attorney, Agent, or Firm* — Warner Norcross & Judd LLP

(57) ABSTRACT

A dock ramp assembly for a docking opening on a facility; the assembly comprising a seal for sealing the docking opening with at least one access door opening on a transport vehicle when the vehicle is docked with the facility; the seal comprising an upper seal which extends over a top peripheral edge of the docking opening and adjacent side peripheral edges of the docking opening, and a lower seal which extends beneath the lower peripheral edge of the docking opening, such that the seal extends around the entire periphery of the docking opening to form a complete seal between the docking opening and the access door opening when the vehicle is docked with the facility; the assembly further comprising a retractable bumper which is transitioned from an extended, in-use position in front of the docking opening, to a retracted, stored position remote from the docking opening.

14 Claims, 9 Drawing Sheets

(56) References Cited

U.S. PATENT DOCUMENTS

| | | | |
|---|---|---|---|
| 4,821,468 A * | 4/1989 | Moore | 52/2.13 |
| 6,073,402 A * | 6/2000 | Moody | 52/173.2 |
| 6,497,076 B1 | 12/2002 | van de Wiel et al. | |
| 6,634,049 B2 * | 10/2003 | Hahn et al. | 14/71.1 |
| 6,739,011 B1 | 5/2004 | Brouillette | |
| 6,883,198 B2 | 4/2005 | Alexander | |
| 7,600,282 B2 | 10/2009 | Grunewald | |
| 7,752,696 B2 * | 7/2010 | Grunewald | 14/69.5 |
| 2002/0144365 A1 | 10/2002 | Alexander | |
| 2002/0162179 A1 | 11/2002 | Hahn et al. | |
| 2006/0254003 A1 | 11/2006 | Grunewald | |

FOREIGN PATENT DOCUMENTS

| | | |
|---|---|---|
| EP | 610792 A1 | 8/1994 |
| EP | 0618156 A1 | 10/1994 |
| EP | 1462400 A1 | 9/2004 |
| EP | 2123582 A1 | 11/2009 |
| EP | 2354055 A2 | 8/2011 |
| WO | 2013120914 | 8/2013 |
| WO | 2014086955 | 6/2014 |

* cited by examiner

DOCK RAMP ASSEMBLY

INTRODUCTION

This invention relates to a dock ramp assembly.

Dock ramp assemblies are used in facilities to allow transport vehicles to dock with the facility and also allow a ramp, alternatively known as a bridging plate, to connect an interior of the transport vehicle with an interior of the facility. In this manner, unloading of goods from the interior of the transport vehicle through at least one access door on the transport vehicle into the interior of the facility can be achieved. Or, loading of loads from the interior of the facility into the interior of the transport vehicle, can be achieved in an efficient manner.

Furthermore, where the goods must be kept in a controlled environment, for example, within a particular temperature range, dock ramp assemblies are used to create a substantially continuous environmentally-controlled link, by way of a ramp, between the interior of the transport vehicle and the interior of the facility. Typically the dock ramp assemblies will have a facility door to keep the facility enclosed.

The term "transport vehicle" shall be understood to encompass any type of vehicle which is used to transport goods. Typically, the transport vehicle will be an articulated truck and trailer; however, it will be apparent to the person skilled in the art that vans and other types of commercial transport vehicles, such as railcars, may be used with the dock ramp assembly of the present invention. The transport vehicles will generally have rear access doors, which are either pivoting doors, vertical sliding doors, or, vertical rolling doors. The transport vehicles dock with the dock ramp assemblies by manoeuvring to a position adjacent the dock ramp assembly so as to load or unload the goods through such access doors.

Throughout this specification, the term "dock ramp assembly" shall be understood to encompass any type of docking bay used to provide a connection or link between the transport vehicle and the facility. The dock ramp assembly will normally comprise a bridging plate or ramp to connect between the interior of the facility and the docked transport vehicle. The dock ramp assembly of the present invention is suitable to receive transport vehicles of different model types and different dimensions; it should be noted that the dock ramp assembly of the present invention does not encompass bespoke dock ramp assemblies which are designed to be used with a specific fleet of transport vehicles having particular dimensions which are only suited to be used with the bespoke dock ramp assemblies. Such bespoke systems are undesirable as only specific transport vehicles can correctly dock with the bespoke dock ramp assemblies. This invention does not suffer from such limitations and has been designed to work with a wide variety of transport vehicles.

Under normal usage, dock ramp assemblies as known from the prior art, allow a transport vehicle to dock with them to permit the loading or unloading of goods. The transport vehicle is usually reversed to a position adjacent the dock ramp assembly and a bridging plate is extended from the dock ramp assembly into the transport vehicle. The dock ramp assemblies comprise a bumper to prevent the transport vehicle from reversing into the dock ramp assembly and damaging the dock ramp assembly.

In many cases, once the transport vehicle has been reversed to a position adjacent the dock ramp assembly, a seal is created around the transport vehicle to prevent external contaminants from entering either the interior of the facility, or, the interior of the transport vehicle during the loading/unloading process. This is particularly important in food-related industries where unwanted contaminants such as rodents, insects, flies and fleas, which could become trapped in the interior of the transport vehicle, can result in an entire load of transported food being rejected by a receiving customer upon the customer opening the transport vehicle and discovering the unwanted contaminants therein. In most examples known from the prior art, only a quasi-seal is created, whereby the quasi-seal forms a seal along both sides of the transport vehicle and over the top of the transport vehicle. Normally there is no seal beneath the bottom of the docking ope as the bumpers are located here and restrict the use of a bottom seal. Such a quasi-seal is disclosed in PCT Patent Publication Number WO2007/076507 (RITE-HITE HOLDING CORPORATION) where a multi-phase resistance bumper is disclosed. The quasi-seal is created around the two sides and the top of a docking ope. The multi-phase resistance bumper is arranged beneath the docking ope to protect the face of the building from damage through vehicle impact; protect the rear of the transport vehicle from damage; prevent the docking seal from damage through over-compression with the transport vehicle; and/or, establish a preferred distance between the transport vehicle and the docking ope for deployment of the ramp. This bumper prevents the use of a bottom seal which the top and side seals As these quasi-seal systems, such as is shown in PCT Patent Publication WO2007/076507, do not seal the bottom of the transport vehicle, this leaves a gap through which contaminants may enter the interior of the transport vehicle and/or the interior of the facility. This is a clear disadvantage to the quasi-seal prior art systems and a solution to this problem is sought as the dock ramp assemblies of the present invention and of the prior art must accommodate transport vehicles of different types and dimensions whilst at the same time minimise the possibility that contaminants can enter the facility or the transport vehicle.

U.S. Pat. No. 4,262,458 (O'NEAL) discloses a complete, four-sided inflatable seal which comprises two side seals, a top seal and a bottom seal. The seals surround a docking ope on a building and are used to create a connection between the building and a rail car, or other such similar vehicle. In this case, there is no need for bumpers as the railcar or other such similar vehicle will run on tracks which will have been set at a predetermined distance from the building and at a predetermined height relative to the docking ope. Thus, the danger of impact between the docking vehicle and the building is negated and the need for a bumper is obviated. U.S. Pat. No. 4,262,458 does not disclose the use of any bumper with its four-sided seal.

However, not all dock ramps can benefit from docking with a railcar or vehicle whereby the height and the positioning of the transport vehicle relative to the docking ope are predetermined and preset. In many cases where the transport vehicle is a truck and trailer, the height of the rear doors on the trailer will depend on the model and the load in the trailer itself as the height of the transport vehicle will change with the weight of the goods it is carrying. None of the dock ramp assemblies of the prior art have been able to create a complete seal around such a transport vehicle, as has defined hereinbefore in this specification, so that they can be docked to the dock ramp assembly and have a complete four-sided seal created between the docking ope and the transport vehicle.

This is, as mentioned above, due to the fact that the transport vehicles have different floor heights and a lower, bottom seal which can accommodate the varying different heights of the different transport vehicles has proved difficult to design. Most transport vehicles have a loading height in the range of 1 metre to 1.4 metres and the seals currently used in dock ramp assemblies known from the prior art cannot accommodate such variations in height between different transport vehicles.

The problem is further exacerbated by the presence of the bumper which is required to protect the dock ramp assembly from damage by transport vehicles as they reverse up to the dock ramp assembly, and damage to the transport vehicles themselves. The bumpers disclosed in the prior art would all prevent such a lower seal, on the bottom of the periphery of the docking ope, from extending in an uninhibited manner to create a seal against the underside of the transport vehicle.

It is a goal of the present invention to provide an apparatus that overcomes at least one of the above mentioned problems.

SUMMARY OF THE INVENTION

The present invention is directed towards a dock ramp assembly for a docking ope on a facility; the dock ramp assembly comprising a seal for sealing the docking ope with at least one access door ope on a transport vehicle when the transport vehicle is docked with the facility; the seal comprising an upper seal which extends over a top peripheral edge of the docking ope and adjacent side peripheral edges of the docking ope, and, a lower seal which extends beneath the lower peripheral edge of the docking ope, such that the seal extends around the entire periphery of the docking ope and the seal is arranged to form a complete seal between the docking ope and the access door ope when the transport vehicle is docked with the facility; wherein, the dock ramp assembly further comprises a retractable bumper which is transitioned from an extended, in-use position in front of the docking ope, to, a retracted, stored position remote from the docking ope.

The advantage of using a retractable bumper which is transitioned from an extended, in-use position in front of the docking ope, to, a retracted, stored position remote from the docking ope is that the bumper can be removed from obstructing the lower seal from extending beneath the lower peripheral edge of the docking ope. In prior art systems, such as U.S. Pat. No. 4,262,458, where a complete seal has been formed, bumpers were not required and therefore did not interfere with the lower seal which extends beneath the lower peripheral edge of the docking ope. In prior art systems, such as WO2007/076507, where bumpers were needed due to the type of transport vehicle docking with the facility, a lower seal could not be used as the bumpers obstructed the lower seal from working properly. By retracting the bumpers after the transport vehicle has reversed up into a suitable docking position, the lower seal can be actuated and a complete seal, extending around the periphery of the docking ope, and between the docking ope and the access door ope on the transport vehicle, can be created.

In a further embodiment, the lower seal is moveable vertically from a stored position remote from the docking ope, into, an in-use position in front of the lower peripheral edge of the docking ope when the retractable bumper is in its retracted, stored position remote from the docking ope, so as to allow the complete seal to be formed between the docking ope and the access door ope.

In a further embodiment, the lower seal is affixed to a moveable mounting plate which moves vertically from a stored position remote from the docking ope, into, an in-use position in front of a lower edge of the periphery of the docking ope when the retractable bumper is in its retracted, stored position remote from the docking ope.

In a further embodiment, a receiving cavity is created between the docking ope and the access door ope when the transport vehicle is docked with the facility; the dock ramp assembly further comprising a pump to pressurise the receiving cavity to a preset level to check the integrity of the actuatable seal in its extended, operable state.

In a further embodiment, the dock ramp assembly comprises a controlled hatch between the receiving cavity and an exterior of the dock ramp assembly; the controlled hatch being controllably opened to allow pressurised air to escape through the hatch and purge the receiving cavity of unwanted contaminants. This is advantageous as it removes unwanted contaminants. It will be understood that a facility door is shut to close off the docking ope, and, a vehicle door on the transport vehicle is also shut to close off the access door ope on the transport vehicle; so that the receiving cavity is defined by the facility door, the vehicle door and the seal.

In a further embodiment, the dock ramp assembly comprises an anti-contaminant gas which is injected to the receiving cavity. In a further embodiment, the anti-contaminant gas is injected into the receiving cavity using the pump, during pressurisation of the receiving cavity.

In a further embodiment, the moveable mounting plate is held between a pair of substantially vertical guide rails which guide the moveable mounting plate vertically from its stored position remote from the docking ope, into, its in-use position in front of the lower peripheral edge of the docking ope; and, the moveable mounting plate being vertically deflectable about its in-use position to accommodate height variations of the transport vehicle as the docked transport vehicle is loaded or unloaded with goods. The moveable mounting plate may comprise springs between it and the pair of substantially vertical guide rails so that the moveable mounting plate, and the lower seal, is deflectable from a height to account for the floor height of the transport vehicle changing as goods are loaded or unloaded from the transport vehicle.

In a further embodiment, the upper seal is formed by a substantially horizontal linear top seal and a pair of linear side seals.

In a further embodiment, the pair of linear side seals are angled to extend upwardly and diagonally outwardly at an angle of between 10° and 30°.

The present invention is further directed towards a dock ramp assembly for a docking ope on a facility; the dock ramp assembly comprising a seal for sealing the docking ope with at least one access door ope on a transport vehicle when the transport vehicle is docked with the docking ope; the seal comprising an upper seal which extends over a top peripheral edge of the docking ope and adjacent side peripheral edges of the docking ope, and, a lower seal which extends beneath the lower peripheral edge of the docking ope, with the upper seal and lower seal acting to form a complete seal around a periphery of the docking ope; wherein, at least one of the lower seal and/or the upper seal are vertically moveable so as to allow the complete seal to be formed between the access door ope on the transport vehicle and the docking ope on the facility.

The advantage of having either the lower seal or the upper seal vertically moveable is that transport vehicles of different heights can be accommodated whilst a complete seal can still be formed between the access door ope on the transport vehicle and the docking ope on the facility. As mentioned hereinbefore, the prior art could not create a complete seal around a docking ope whilst at the same time accounting for transport vehicles of different heights and dimensions. This embodiment provides an alternative solution to this problem by moving the lower seal vertically up, or the upper seal vertically down, into a position whereby the seal can be actuated to form a complete seal between the docking ope and the access door on a transport vehicle which is docked. In this embodiment, it is not necessary to retract the bumpers to allow the seal to be actuated, but rather the seal can be moved to allow it to be actuated. Nonetheless the same problem is solved.

In a further embodiment, the lower seal is a lower, substantially horizontal seal which is vertically moveable.

In a further embodiment, the lower, substantially horizontal seal is affixed to a moveable mounting plate which moves vertically from a stored position remote from the docking ope, into, an in-use position in front of a lower peripheral edge of the docking ope.

In a further embodiment, a receiving cavity is created between a facility door which closes the docking ope, and, a vehicle door which closes the access door ope on the transport vehicle when the transport vehicle is docked with the docking ope; the dock ramp assembly further comprising a pump to pressurise the receiving cavity to a preset level to check the integrity of the formed complete seal.

In a further embodiment, the dock ramp assembly comprises a controlled hatch between the receiving cavity and an exterior of the dock ramp assembly; the controlled hatch being controllably opened to allow pressurised air to escape through the hatch and purge the receiving cavity of unwanted contaminants.

In a further embodiment, the dock ramp assembly comprises an anti-contaminant gas which is injected to the receiving cavity.

In a further embodiment, the anti-contaminant gas is injected into the receiving cavity using the pump, during pressurisation of the receiving cavity.

In a further embodiment, the moveable mounting plate is held between a pair of substantially vertical guide rails which guide the moveable mounting plate vertically from its stored position remote from the docking ope, into, its in-use position in front of the lower peripheral edge of the docking ope; and, the moveable mounting plate is vertically deflectable about its in-use position to accommodate height variations of the transport vehicle as the docked transport vehicle is loaded or unloaded with goods.

The present invention is directed to a dock ramp assembly comprising a fixed framework defining a docking ope suitable for docking with a transport vehicle; the fixed framework mounting an actuatable seal having a retracted, inoperable state and an extended, operable state; the dock ramp assembly further comprising a bridging plate, having a stored position and an in-use position; wherein, the actuatable seal is located around a periphery of the docking ope so as to form a complete seal around the transport vehicle when the transport vehicle is docked with the docking ope and the actuatable seal is in its extended, operable state.

The advantage of providing the actuatable seal which is located around the entire periphery of the docking ope so as to form a complete seal around the transport vehicle when the transport vehicle is docked with the docking ope and the actuatable seal is in its extended, operable state, is that, a seal is created around the entire transport vehicle, thus creating a sealed passageway between the interior of the transport vehicle and the interior of the facility. The sealed passageway between the interior of the transport vehicle and the interior of the facility prevents any external contaminants, such as rodents, insects, fleas and flies from entering either the interior of the facility or interior of the transport vehicle. This ensures that any goods which need to be transported by the transport vehicle can be kept within a controlled environment, inside the interior of the facility, which is likely to be a food production plant or a manufacturing plant, through the sealed passageway and into the interior of the transport vehicle. This is extremely desirable for many industries, and as mentioned above, in particular the food industry where the manufacture, storage and transport of the food in a fully controlled environment is preferable from a hygienic, and, a health and safety perspective.

In a preferred embodiment, the bridging plate is rotatable from the stored position into the in-use position, whereby, in its in-use position the bridging plate protrudes into the transport vehicle when the transport vehicle is docked with the docking ope.

In a preferred embodiment, the bridging plate is telescopically extendable from the stored position into the in-use position, whereby, in its in-use position the bridging plate abuts against a rear end of the transport vehicle when the transport vehicle is docked with the docking ope.

The present invention is further directed to a dock ramp assembly comprising a fixed framework defining a docking ope suitable for docking with a transport vehicle; the fixed framework mounting a seal for sealing the docking ope with the transport vehicle when the transport vehicle is docked with the docking ope; the dock ramp assembly further comprising a bridging plate having a stored position and an in-use position, whereby, in its in-use position the bridging plate protrudes into or abuts against the transport vehicle when the transport vehicle is docked with the docking ope; wherein, the seal is located around a periphery of the docking ope, and, a portion of the seal is moveable so as to allow a seal to be formed completely around the transport vehicle.

This embodiment of the present invention is advantageous as a seal can be formed completely around the docked transport vehicle to ensure that no unwanted contaminants can enter the transport vehicle, dock ramp assembly or facility when the transport vehicle is docked to the dock ramp assembly by only moving a portion of the seal. By only having to articulate a portion of the seal, the construction of the dock ramp assembly is simplified. The seal, which may be permanently in an operable state or may be actuatable to be transitionable into an operable state, is moveable as this allows a bumper to be used to protect the dock ramp assembly as the transport vehicle drives up to the docking ope, and subsequently allows the portion of the seal to be moved into position to create a complete seal around the transport vehicle, which would otherwise not have been possible due to the presence of the bumper.

In a further embodiment, the seal is an actuatable seal having a retracted, inoperable state and an extended, operable state.

In a further embodiment, the portion of the seal which is moveable is a lower, substantially horizontal linear seal. The lower, substantially horizontal linear seal is moved into position in front of a retractable bumper.

In a further embodiment, the dock ramp assembly further comprises a retractable bumper which is transitioned from an extended, in-use position in front of the docking ope, to, a retracted, stored position remote from the docking ope.

This is particularly advantageous as the bumper can be transitioned to a retracted, stored position which is remote from the docking ope, and therefore does not block the docking ope. Furthermore, the retraction of the bumper allows a lower seal to be created on the bottom side of the transport vehicle, thus facilitating the creation of the seal completely around the periphery of the docking ope. It will be readily understood that that retractable bumper in its retracted, stored position remote from the docking ope encompasses the scenarios where the retractable bumper is completely remote from the docking ope, and also the where the retractable bumper has been moved away from being in front of the docking ope, but may form part of an edge of the docking ope. In essence, the retractable bumper is moved to allow space for the lower seal from the bottom of the docking ope to be established against an underside of the transport vehicle.

In a further embodiment, the actuatable seal is formed by an upper arch-shaped seal and a lower, substantially horizontal linear seal; the upper arch-shaped seal being located around an upper edge and side edges of the periphery of the docking ope; and, the lower, substantially horizontal linear seal being affixed to a moveable mounting plate which moves vertically from a stored position remote from the docking ope, into, an in-use position in front of a lower edge of the periphery of the docking ope when the retractable bumper is in its retracted, stored position remote from the docking ope. This is seen to be particularly advantageous as the movable mounting plate allows the lower seal to be transitioned into position, preferably at a suitable height for the transport vehicle, so that the compete seal can be created.

In a further embodiment, the dock ramp assembly is connected to a facility; the fixed framework defines a receiving cavity between a docked transport vehicle and the facility; the dock ramp assembly further comprising a pump to pressurise the receiving cavity to a preset level to check the integrity of the actuatable seal in its extended, operable state. Preferably the integrity of the actuatable seal is checked by pressurising the receiving cavity to a preset threshold and monitoring the pressure level in the receiving cavity for a period of time thereafter.

In a further embodiment, the dock ramp assembly comprises a controlled hatch between the receiving cavity and an exterior of the dock ramp assembly; the controlled hatch being opened to allow pressurised air to escape through the hatch and purge the receiving cavity of unwanted contaminants. In this manner, the receiving cavity can be purged of any contaminants, such as insects or fleas, prior to creating the sealed passageway between the interior of the transport vehicle and the interior of the facility.

In a further embodiment, the dock ramp assembly comprises an anti-contaminant gas which is injected to the receiving cavity. The anti-contaminant gas may preferably be an anti-bacterial gas such as an insecticide or a disinfectant which can fumigate the receiving cavity to ensure that the receiving cavity is sufficiently purged and free of any contaminants.

In a further embodiment, the anti-contaminant gas is injected into the receiving cavity using the pump, during pressurisation of the receiving cavity.

In a further embodiment, the moveable mounting plate is held between a pair of substantially vertical guide rails which guide the moveable mounting plate vertically from its stored position remote from the docking ope, into, its in-use position in front of the lower edge of the periphery of the docking ope; and, the moveable mounting plate is deflectable about its in-use position to accommodate height variations of the transport vehicle as the docked transport vehicle is loaded or unloaded with goods.

In a further embodiment, the upper arch-shaped seal is formed by a substantially horizontal linear top seal and a pair of linear side seals. Preferably the substantially horizontal linear top seal and the pair of linear side seals are orthogonally arranged to form the arch-like seal.

In a further embodiment, the pair of linear side seals are angled to extend upwardly and diagonally outwardly at an angle of between 10° and 30°. This is advantageous as many of the yards where the dock ramp assemblies are located tend to slope downwardly away from the dock ramp assembly and therefore any transport vehicle docked with the dock ramp assembly will also tend to slope away from the dock ramp assembly. Consequently, in order to ensure a functioning seal around the transport vehicle, it is advantageous to have the pair of linear side seals angled at between 10° and 30° from the horizontal.

In a further embodiment, the actuatable seal is formed by an inflatable bladder. In a further embodiment, the inflatable bladder comprises a plurality of inflatable bladders located around the periphery of the docking ope.

The present invention is further directed towards a method of docking a transport vehicle with a facility using a dock ramp assembly connected to the facility, the method forming a complete seal between the dock ramp assembly and the transport vehicle and comprising the steps of driving the transport vehicle to a position adjacent a docking ope in the dock ramp assembly; and, moving a portion of a seal to form the complete seal between the dock ramp assembly and the transport vehicle.

In a further embodiment, the method further comprises the steps of pressurising a receiving cavity, created between the facility and the transport vehicle, to a preset threshold; after pressurising the receiving cavity, monitoring the pressure in the receiving cavity to check that the pressure in the receiving cavity does not drop by more than a predetermined amount over a defined period.

In a further embodiment, the method further comprises the steps of, after checking that the pressure in the receiving cavity does not drop by more than a predetermined amount over a defined period, purging the receiving cavity of unwanted contaminants by opening a controlled hatch on the dock ramp assembly to allow a sudden release of air from the pressurised receiving cavity.

In a further embodiment, the method further comprises the steps of immediately prior to purging the receiving cavity, fumigating the receiving cavity using an anti-bacterial gas which is injected into the receiving cavity.

In a further embodiment, the method further comprises the steps of moving a bridging plate to form a ramp between an interior of the transport vehicle and an interior of the facility.

DETAILED DESCRIPTION OF EMBODIMENTS

The invention will be more clearly understood from the following description of some embodiments thereof, given by way of example only, with reference to the accompanying drawings, in which.

Figure 1:
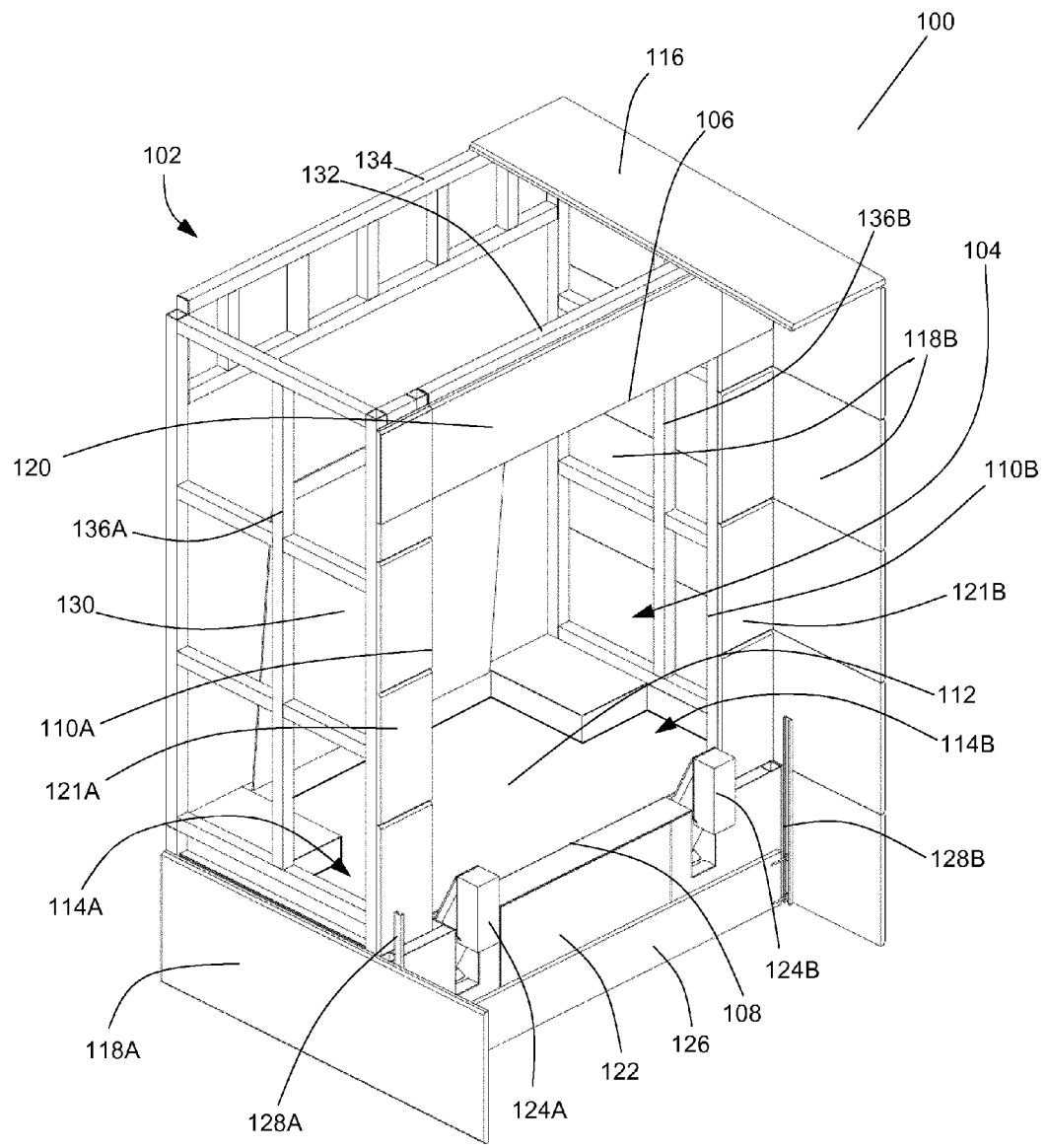
FIG. 1 is a partially exposed, perspective view of a dock ramp assembly in accordance with the present invention.

Referring to FIG. 1, there is provided a dock ramp assembly indicated generally by reference numeral 100. The dock ramp assembly 100 may be retrofitted to an existing facility (not shown).

The dock ramp assembly 100 comprises a fixed framework indicated generally by reference numeral 102. A forward side of the fixed framework 102 defines a docking ope indicated generally by reference numeral 104. A rearward side of the fixed framework 102 will abut against and be connected to the facility.

The docking ope 104, on the forward side, is defined by an upper peripheral edge 106, a lower peripheral edge 108 and side peripheral edges 110A, 1108 which are adjacent to the periphery of the docking ope 104.

A facility ope (not shown) leading into the facility will be provided adjacent the rearward side of the fixed framework 102 and will be encompassed by the dock ramp assembly 100.

The dock ramp assembly 100 comprises a floor 112 having side wings indicated generally by reference numerals 114A, 114B which are dimensioned to receive a rearward access door (not shown) on a transport vehicle (not shown).

The framework 102 is covered by roof panels 116, only one of which is shown in FIG. 1, and side panels 118A, 118B, only some of which are shown in FIG. 1. The roof panels 116 and side panels 118A, 118B comprise extended portions which protrude away from the framework 102 to form a porch in front of the docking ope 104. These extended portions of the roof panels 116 and side panels 118A, 118B partially form the periphery of the docking ope 104. The periphery of the docking ope 104 is also formed by an upper face panel 120, side face panels 121A, 121B and a lower face panel 122.

Two retractable bumpers 124A, 124B are located adjacent the lower edge 108 of the docking ope 104. The retractable bumpers 124A, 124B may be transitioned from an extended, in-use position in front of the docking ope 104, to, a retracted, stored position remote from the docking ope 104. In FIG. 1, the retractable bumpers 124A, 124B are shown in their extended, in-use position which locates the retractable bumpers 124A, 124B in front of the docking ope 104. In a preferred embodiment, the retractable bumpers 124A, 124B transition diagonally outwardly to a position which is approximately 200 mm in front of the lower face 122 of the docking ope 104 and 400 mm above the lower edge 108 of the docking ope 104. The lower edge 108 of the docking ope 104 will preferably be 1.2 metres above a lowermost portion of the lower front face panel 122 of the dock ramp assembly 100. The retractable bumpers 124A, 124B are moved from their extended, in-use position in front of the docking ope 104, to, their retracted, stored position remote from docking ope 104 by hydraulic rams (reference numeral 202B in FIG. 2). It will be appreciated that other driven means may be used to move the retractable bumpers 124A, 124B from their extended, in-use position in front of the docking ope 104, to, their retracted, stored position remote from docking ope 104.

A movable mounting plate 126 is held between a pair of substantially vertical guide rails 128A, 128B which guide the movable mounting plate 126 vertically between a stored position which is remote from the docking ope 104 and an in-use position in front of the lower edge 108 of the docking ope 104. The movable mounting plate 126 is moved vertically along the guide rails 128A, 128B by a pulley mechanism (not shown). It will be understood that in other embodiments, driven means such as motors, pneumatic lifts, hydraulic rams and the like may be used to lift and lower the movable mounting plate 126 along the length of the substantially vertical guide rails 128A, 128B. The movable mounting plate 126 is deflectable about its in-use position. That is to say, the movable mounting plate 126, through urging means, is biased towards its in-use position but can be deflected downwardly along a portion of the guide rails 128A, 128B in order to accommodate a lowering in the height of the transport vehicle (not shown) as goods are loaded into the transport vehicle.

A bridging plate 130, which may alternatively be known as a ramp, is located in the dock ramp assembly 100 and is rotatable between a stored position, which is usually a substantially vertical, upright position, into an in-use position which is usually a substantially horizontal position. The bridging plate 130 may be manually rotated or maybe rotated by a driven means such as a hydraulic ram (not shown). Furthermore, the bridging plate 130 may be telescopically extendable to abut against a rearward side of the transport vehicle to allow goods to be loaded or unloaded from the transport vehicle. Such telescopically extending bridging plates are particularly useful when the transport vehicle is loaded with goods which are stacked up to the very end of the transport vehicle. It will also be understood that a telescopic dock leveller could be used with the dock ramp assembly 100.

For clarity, the actuatable seal which forms part of the dock ramp assembly 100 is not shown in FIG. 1. However, it will be easily understood by a person skilled in the art that the actuatable seal is located around the periphery of the docking ope 104. The actuatable seal has a retracted, inoperable state and an extended, operable state. When in its extended, operable state, the actuatable seal forms a complete seal around a transport vehicle when the transport vehicle is docked with the docking ope 104. In a preferred embodiment, the actuatable seal is formed from inflatable bladders which when inflated, come into contact with and abut against a trailer portion of the transport vehicle so as to form a sealed passageway between the interior of the transport vehicle, through the dock ramp assembly 100, into an interior of the facility. In the present embodiment shown of FIGS. 1 to 8, the actuatable seal is comprised of a separate substantially horizontal linear top seal, a pair of linear side seals and a substantially horizontal linear lower seal. The substantially horizontal linear top seal is mounted on an underside of the extended portions of the roof panels 116; and, the linear side seals are mounted on an inner face of the extended portions of the side panels 118A, 118B. The lower seal is mounted on the movable mounting plate 126.

In a further embodiment of the invention, it will be readily understood that the actuatable seal may comprise an upper arch-shaped seal and the substantially horizontal linear lower seal. In this further embodiment, the upper arch-shaped seal is located around the upper edge 106 and side edges 110A, 110B of the docking ope 104 by mounting the arch-shaped seal on the other face panel 120 and side face panels 121A, 121B of the dock ramp assembly 100. The substantially horizontal linear lower seal would remain mounted on the movable mounting plate 126.

The framework 102 comprises a forward docking-ope-defining frame 132, a rearward facility-abutting frame 134 and supporting side frames 136A, 136B.

Referring now to FIGS. 2 to 8, wherein like parts previously described have been assigned the same reference numerals, the operation of the dock ramp assembly 100 will now be described.

Figure 2:
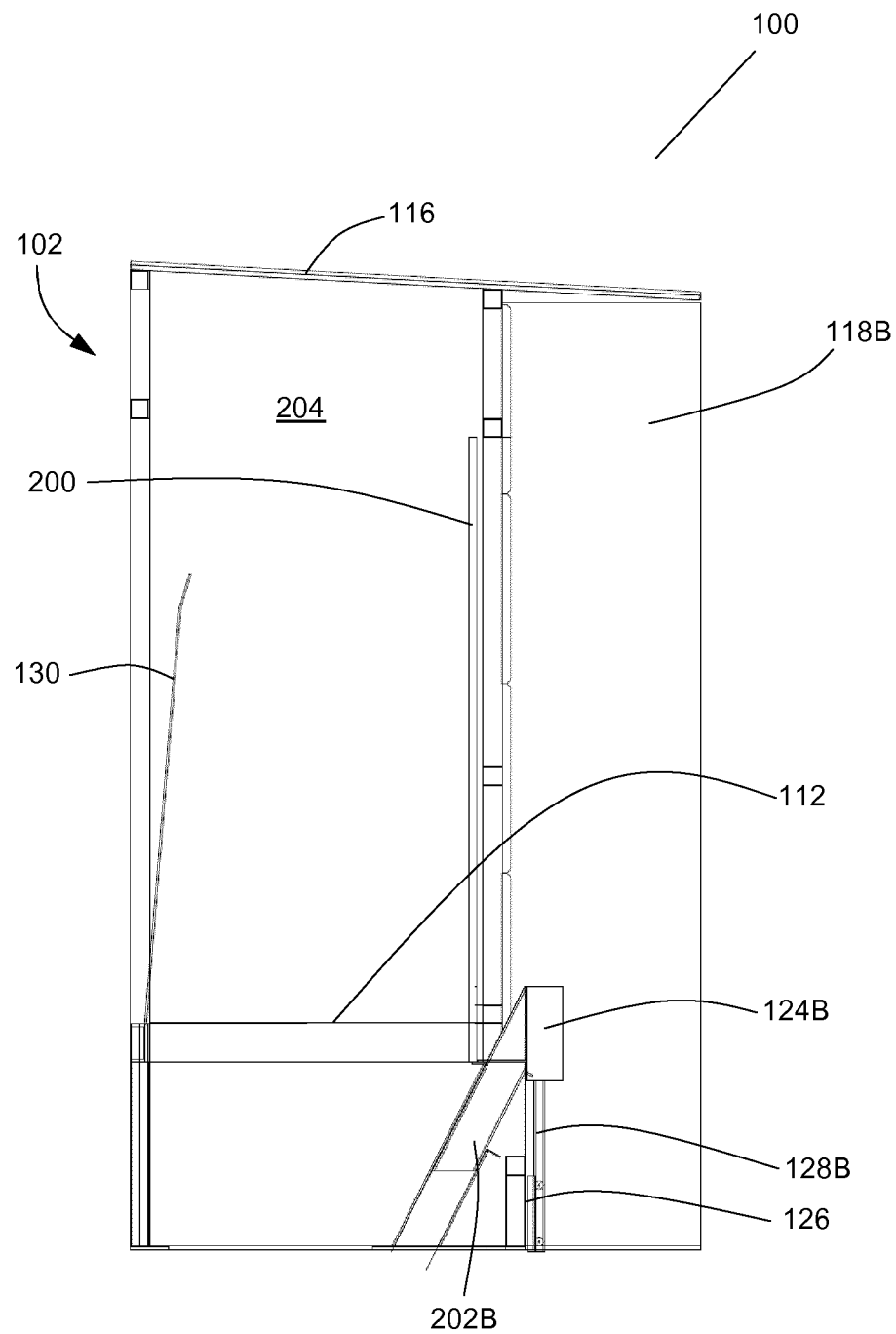
FIG. 2 is a side elevational sectional view of the dock ramp assembly of FIG. 1 showing dock bumpers extended to receive a transport vehicle.

With reference to FIG. 2, a dock ramp assembly door 200 is shown in its closed position, which closes the docking ope 104. One of the hydraulic rams 202B is shown, and is in its extended state causing the retractable bumper 124B to also be in its extended in-use position in front of the docking ope 104. It will be understood that the same, mutatis mutandis, applies to the unseen hydraulic ram for the other retractable bumper 124A. Thus, the retractable bumpers 124A, 124B are in their extended, in-use positions in front of the docking ope 104 to protect the docking ope 104 from any damage by a reversing transport vehicle. The movable mounting plate 126 is in its stored position remote from the docking ope 104. The fixed framework 102 of the dock ramp assembly 100 defines a receiving cavity 204 within the dock ramp assembly 100.

Figure 3:
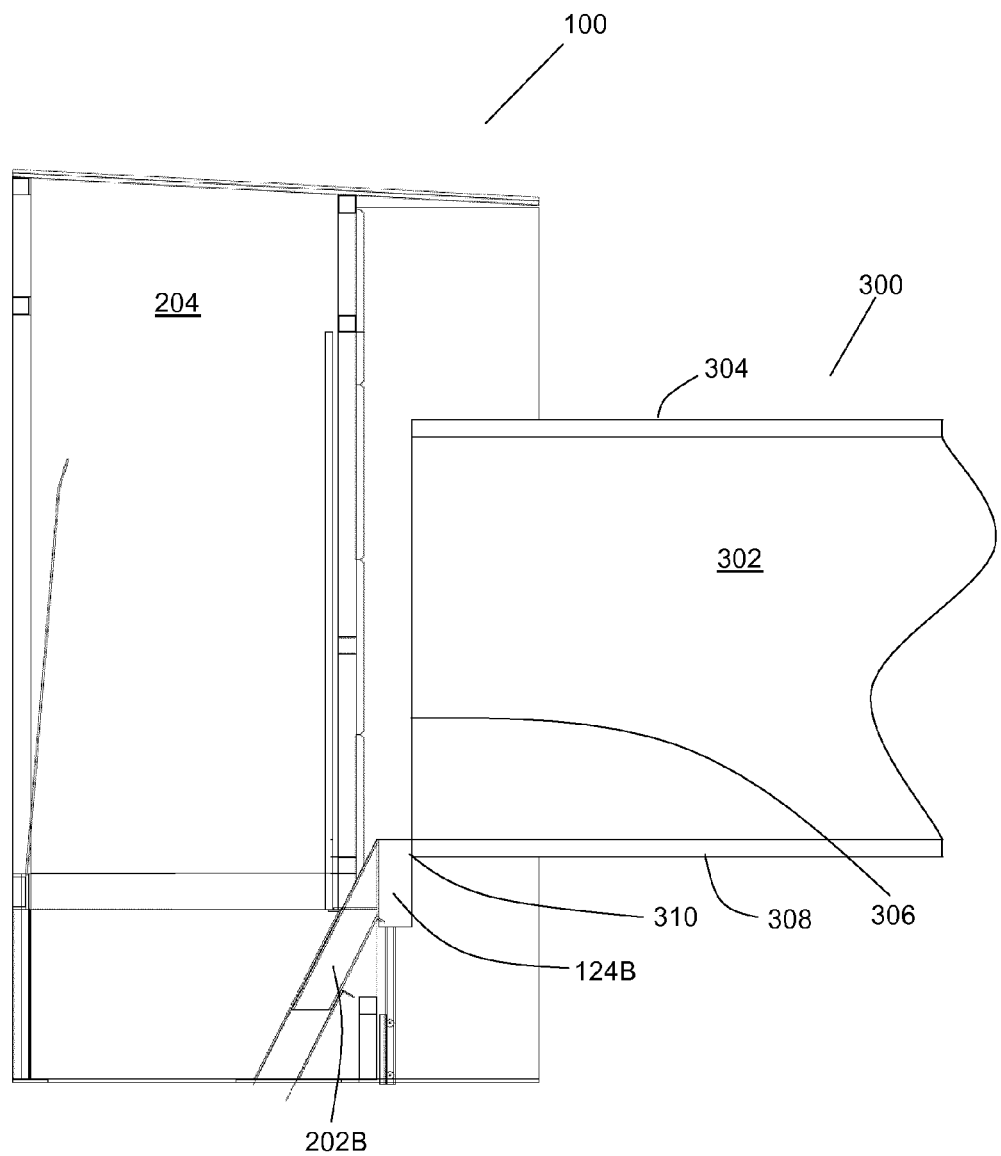
FIG. 3 is a side elevational sectional view of the dock ramp assembly of FIG. 1 shown receiving the transport vehicle.

In FIG. 3, it can be seen that a transport vehicle indicated generally by reference numeral 300 is in the process of docking with the dock ramp assembly 100 by reversing to a position adjacent the docking ope 104.

The transport vehicle 300 comprises an interior 302 defined by a roof 304 of the transport vehicle 300, a rearward access door 306 of the transport vehicle 300, and, an underside 308 of the transport vehicle. A lower, rearward edge 310 of the transport vehicle 300 contacts against the retractable bumpers 124A, 124B.

Figure 4:
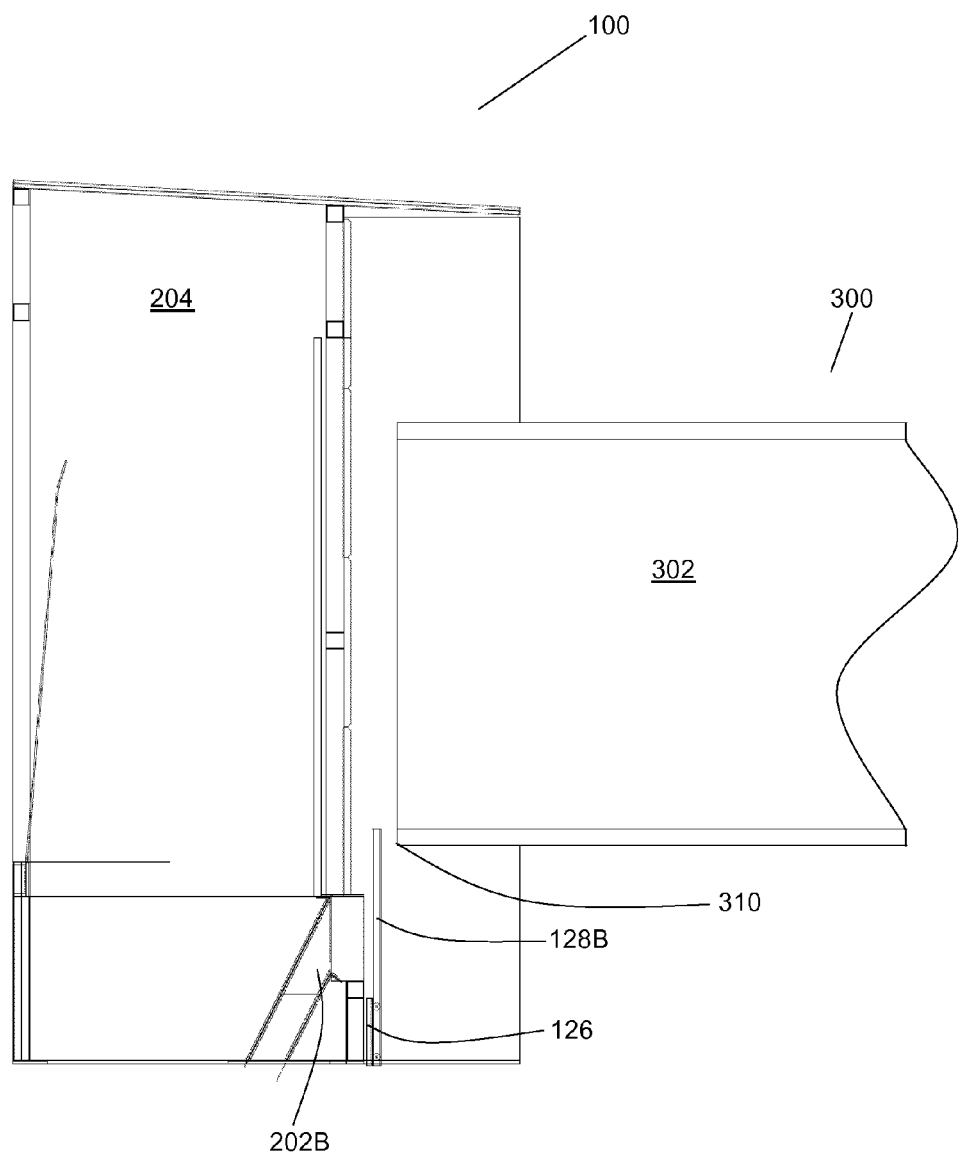
FIG. 4 is a side elevational sectional view of the dock ramp assembly of FIG. 1 showing the dock bumpers retracted and a lower seal mounting plate raised, having received the transport vehicle.

In FIG. 4, the retractable bumpers 124A, 124B are transitioned from their extended, in-use position into their retracted, stored position remote from the docking ope 104.

Figure 5:
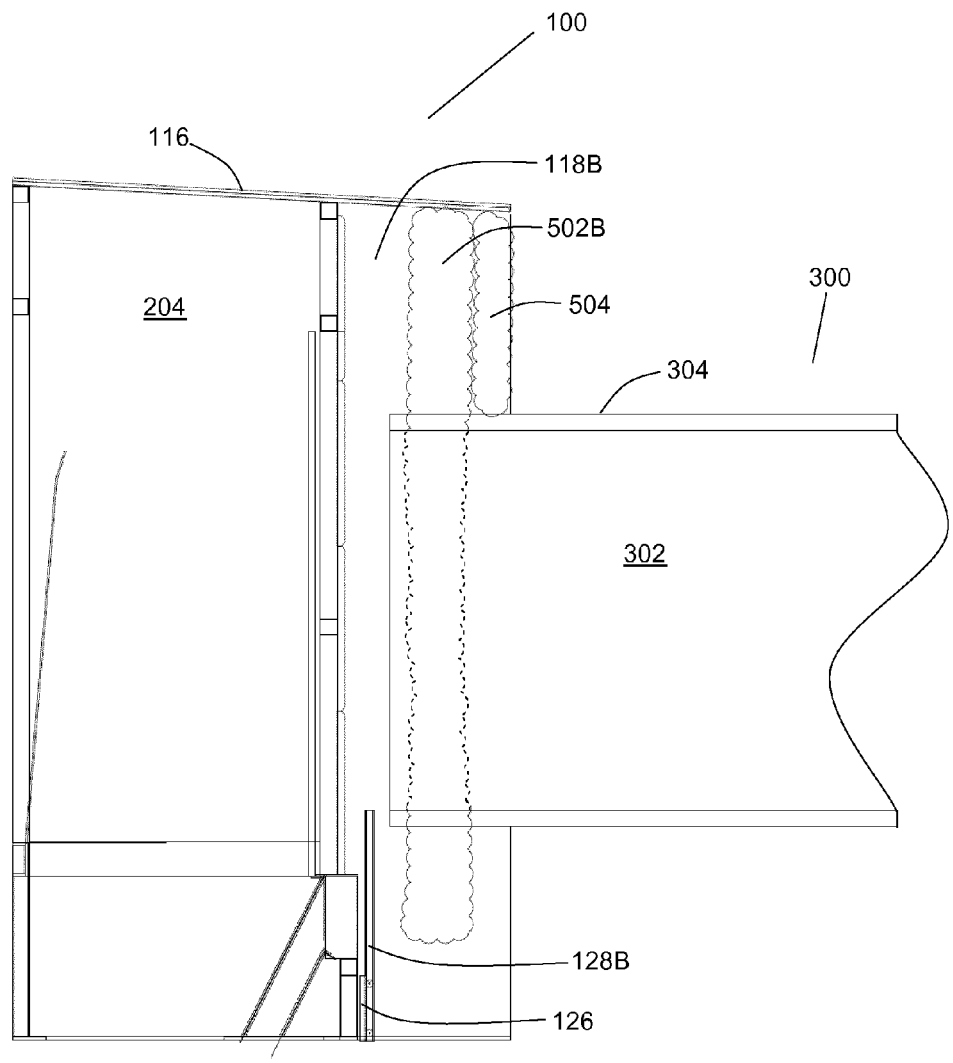
FIG. 5 is a side elevational sectional view of the dock ramp assembly of FIG. 1 showing an upper seal and side seals inflated in abutment against the transport vehicle.

In FIG. 5, the substantially horizontal linear top seal 504, which is comprised of an inflatable bladder in this embodiment, is inflated into its extended, operable state to depend from an underside of the extended portion of the roof panels 116 to abut against the roof 304 of the transport vehicle 300. The linear side seal 502B, which is comprised of an inflatable bladder in this embodiment, is inflated into its extended, operable state to jut out from an inside face of the extended portion of the side panel 118B to abut against the side of the transport vehicle 300. It will of course be understood that a similar inflation of the linear side seal on the other side of the transport vehicle 300 also occurs.

Figure 6:
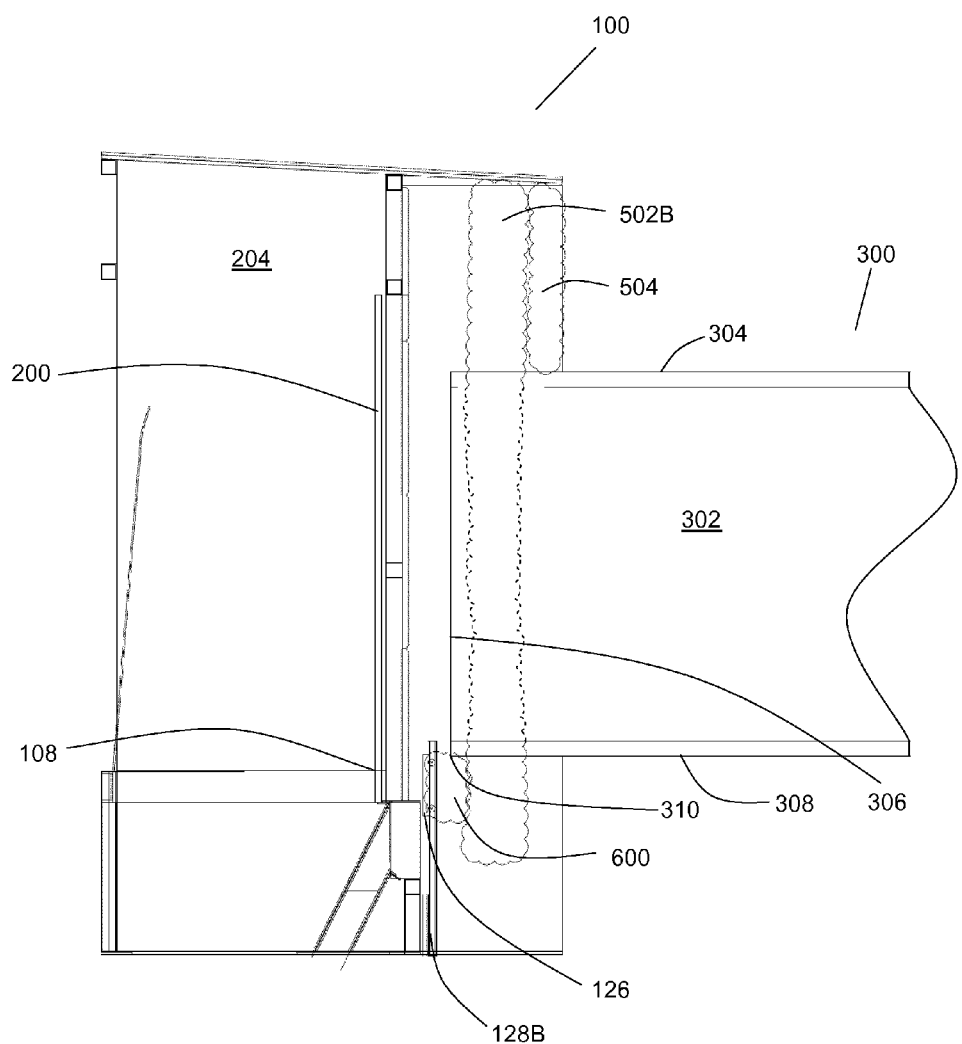
FIG. 6 is a side elevational sectional view of the dock ramp assembly of FIG. 5 showing a lower seal also inflated in abutment against the transport vehicle.
Figure 7:
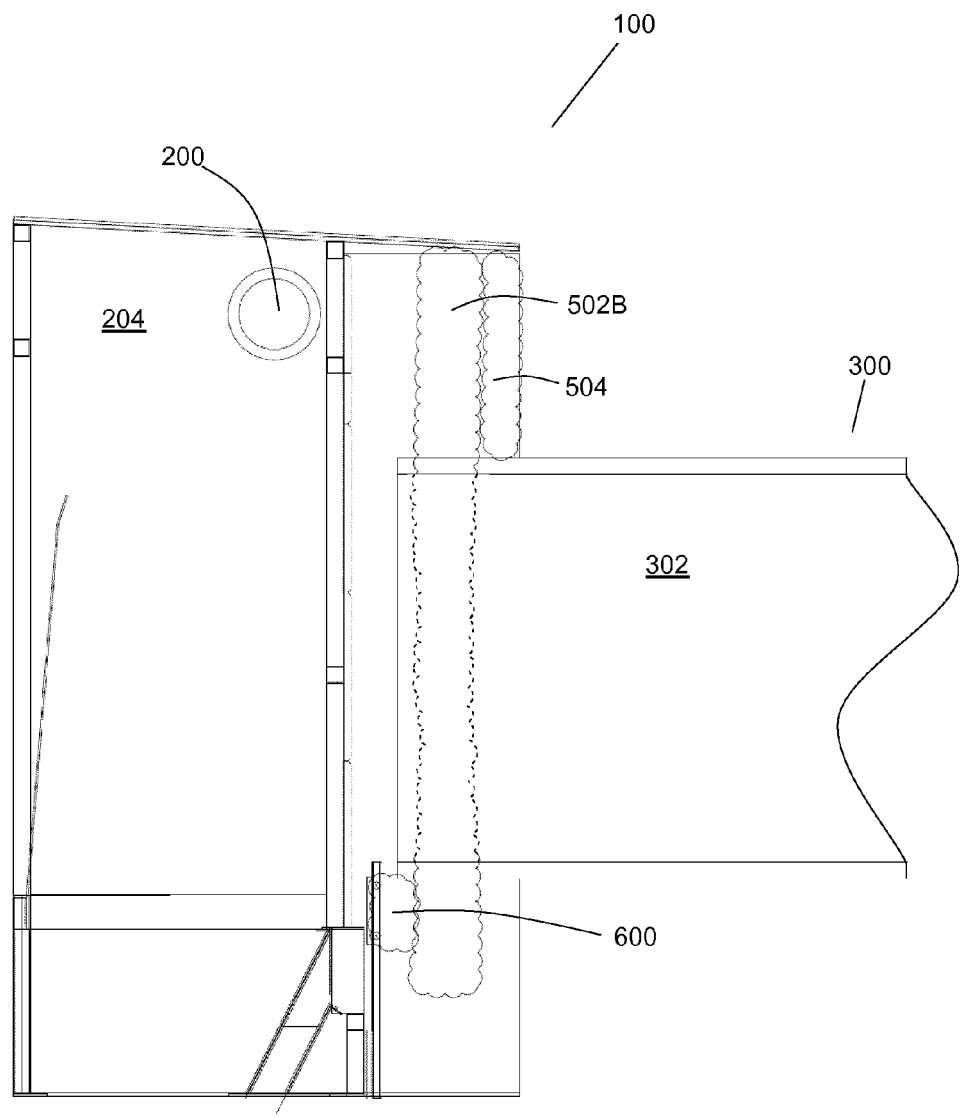
FIG. 7 is a side elevational sectional view of the dock ramp assembly of FIG. 6 showing a dock ramp assembly door in its opened state.

In FIG. 6, the movable mounting plate 126 is lifted upward by guiding it along the guide rails 128A, 128B into its in-use position in front of the lower edge 108 of the docking ope 104. The substantially vertical linear lower seal 600 which is mounted on the movable mounting plate 126 is inflated so that it abuts with the lower, rearward edge 310 and underside 308 of the transport vehicle 300.

In their extended, operable states, the substantially horizontal linear top seal 504, the linear side seal 502B and other linear side seal (not shown), and, the substantially vertical linear lower seal 600 abut against one another and the transport vehicle 300 so as to form a sealed passageway, from the interior at 302 of the transport vehicle 300, through the receiving cavity 204 of the dock ramp assembly 100, to an interior of the facility (not shown).

Once the actuatable seal has been extended into its operable position, a pump (not shown) is used to pressurise the receiving cavity 204. Pressurisation of the receiving cavity 204 can be used to check the integrity of the sealed passageway.

In a preferable embodiment, the dock ramp assembly 100 further comprises a controlled hatch (not shown) which can be opened to allow pressurised air in the receiving cavity 204 to escape. After pressurising the receiving cavity 204 to a relatively high pressure in comparison to the ambient atmosphere, the controlled hatch can be opened causing the pressurised air to suddenly escape through the controlled hatch. This sudden depressurisation of the receiving cavity 204 will cause any contaminants, such as insects, flies and fleas that have been trapped in the receiving cavity 204 to be expelled from the receiving cavity 204. In this manner, the dock ramp assembly 100 is purged of unwanted contaminants. The controlled hatch is closed shortly after purging the receiving cavity 204 in order to maintain the integrity of the sealed passageway.

In yet a further embodiment, an anti-contaminant gas may be introduced into the receiving cavity 204 to fumigate the receiving cavity and to hence purge and sterilise the receiving cavity 204. In a preferable embodiment, the anti-contaminant gas may be an anti-bacterial agent, a bactericide or a fungicide.

Returning now to FIG. 7, once a controller (not shown) is content that the receiving cavity 204 has been purged of any contaminants, and the controlled hatch is closed, the dock ramp assembly door 200 is opened. In the present embodiment, a roller door is used those will be appreciated that any type of known docking bay door may be used.

Figure 8:
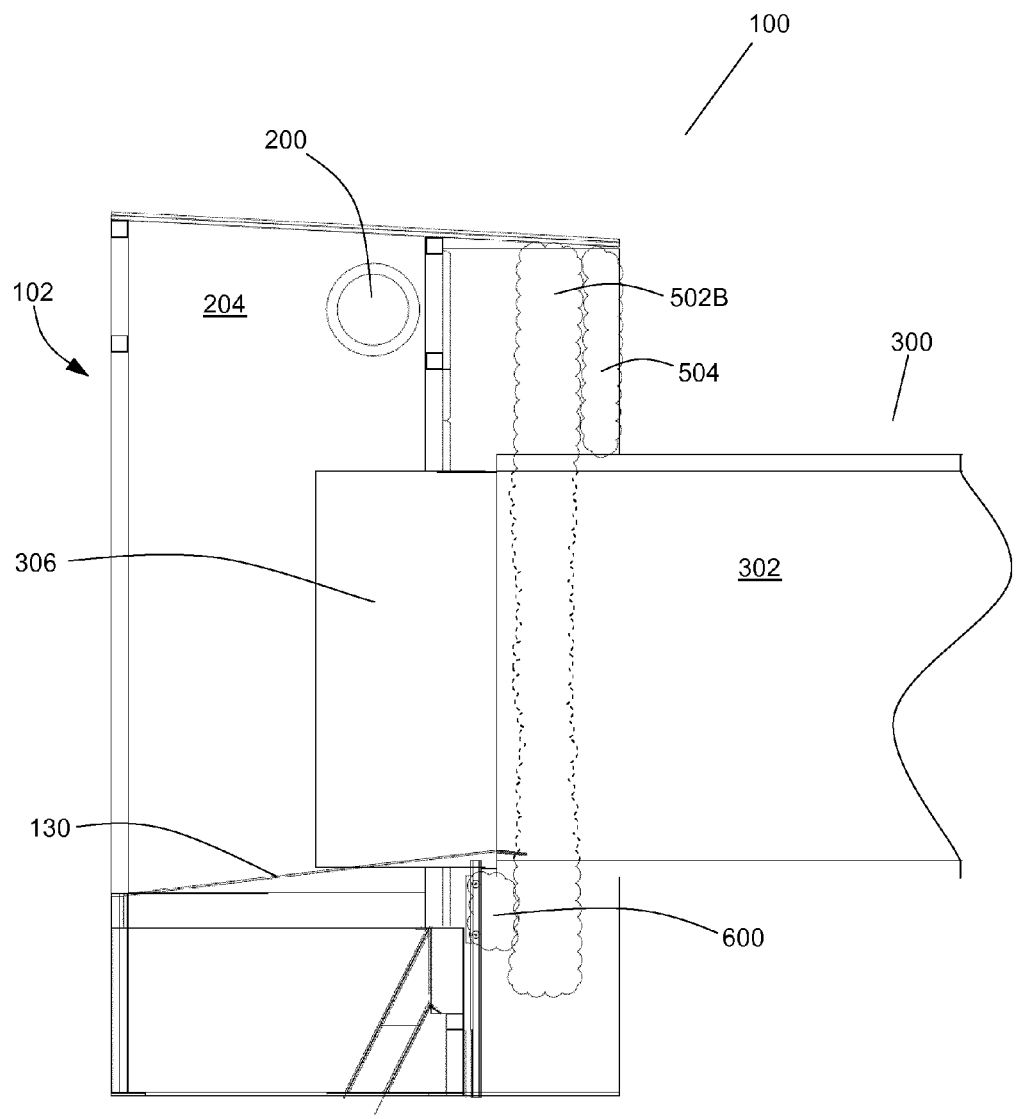
FIG. 8 is a side elevational sectional view of the dock ramp assembly of FIG. 7 showing rear doors of the transport vehicle opened and a bridging plate in its in-use position protruding into the transport vehicle; and, FIG. 9 is a partially exposed, perspective view of a dock ramp assembly in accordance with a further embodiment of the present invention.

With reference to FIG. 8, the rearward access door 306 of the transport vehicle 300 is opened and the bridging plate 130 is rotated to protrude into the interior 302 of transport vehicle 300 in order to create a substantially continuous planar surface, by way of a ramp, for the loading and unloading of goods between the transport vehicle 300 and the facility. Finally, the facility ope door (not shown) into the facility can be opened.

As can be seen, the creation of a complete seal which completely surrounds the transport vehicle 300 is highly advantageous as a sealed passageway is created using the receiving cavity 204. This is achievable by using the retractable bumpers 128A, 128B and movable mounting plate 126 having the substantially vertical linear lower seal 600 mounted thereon.

Figure 9:
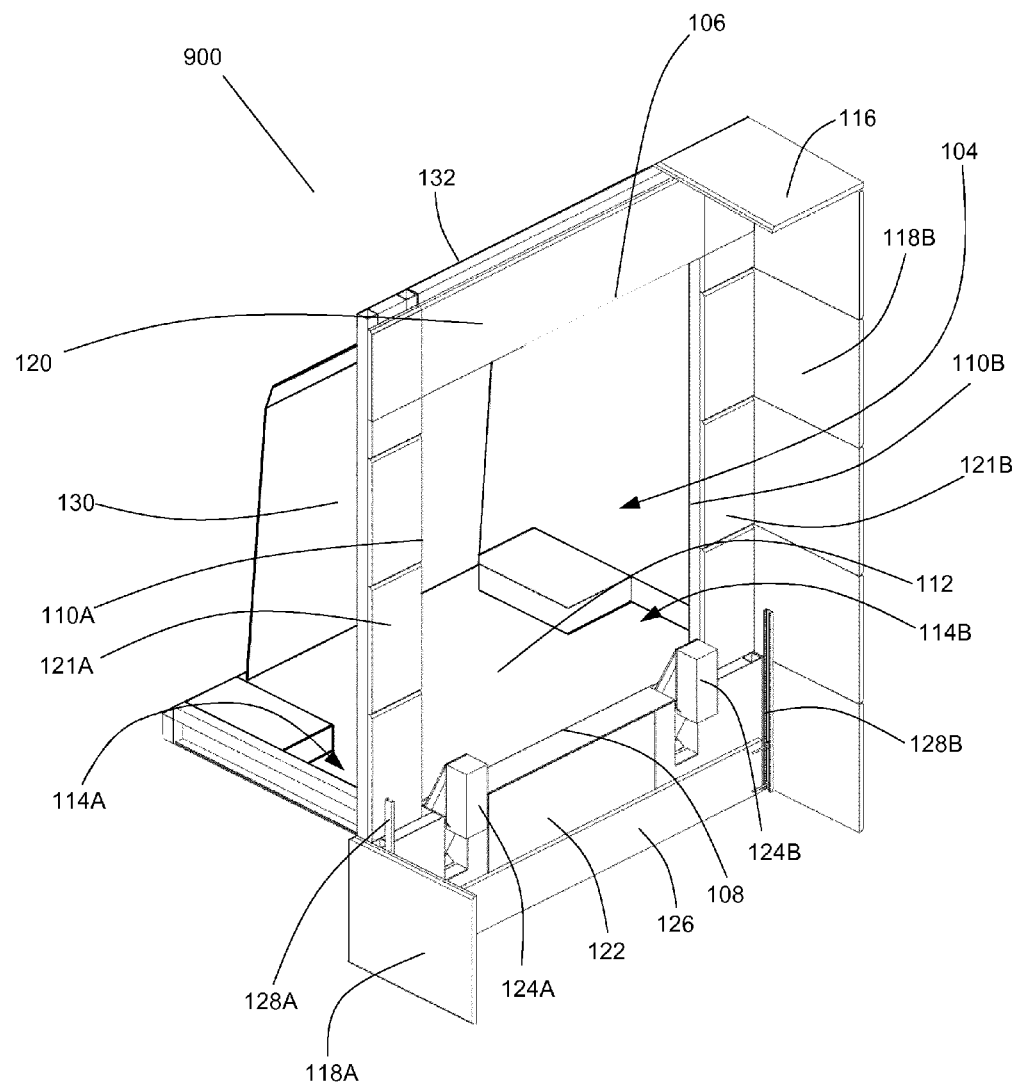

With reference now to FIG. 9, with like parts previously described having the same reference numerals, there is provided a further embodiment of a dock ramp assembly indicated generally by reference numeral 900. Whereas the dock ramp assembly 100 of the above-described embodiment could be retro-fitted to an existing facility, the dock ramp assembly 900 of this second described embodiment is designed to be installed during the construction of a new facility. The rearward facility-abutting frame 134 and supporting side frames 136A, 1368 are unnecessary as these can be replaced by the superstructure of the new facility. The forward docking-ope-defining frame 132 remains but in this embodiment, the facility ope door (not shown) will be located in the docking ope 104. As a consequence, the receiving cavity (not indicated) will be relatively thin in this embodiment, formed as it will between the facility ope door and the rearward door of the transport vehicle.

As can be imagined, the floor 112 and the side wings indicated generally by reference numerals 114A, 1148 are inside the facility, on the facility side of the facility ope door (not shown). Furthermore, the bridging place 130 is also located within the facility.

In this embodiment, the floor panels 116 and side panels 118A, 1188 entirely form the porch of the dock ramp assembly 900.

The features of the dock ramp assembly 900 remain, mutatis mutandis, otherwise unchanged. In particular, a transport vehicle (not shown) may be reversed up to abut against the retractable bumpers 124A, 124B. The retractable bumpers 124A, 124B are then retracted to allow the movable mounting plate 126 to be raised adjacent the lower, rearward edge of the transport vehicle. The actuatable seal, including the lower seal on the moveable mounting plate 126, can be extended into its operable state so as to form a complete seal around the transport vehicle when the transport vehicle is docked with the docking ope 104. The thin receiving cavity formed between the docking ope 104 and the rearward door of the transport vehicle can be pressurised to check the integrity of the seal. As described here in above, further purging, cleansing and sterilisation techniques may also be applied. Once the receiving cavity is deemed suitable by a controller as having formed a hygienic, sealed passageway, the facility ope door (not shown) is opened to subsequently allow the rearward door of the transport vehicle to be opened into the facility. Finally, the bridging plate 130 is rotated to protrude into an interior of the transport vehicle, or may be telescopically extended to abut against a side of the transport vehicle.

It will be understood that the dock ramp assembly, and in particular the receiving cavity, may be located within an interior of the facility. In such an embodiment, the receiving cavity would create an enclosed space within the confines of the facility.

The term "actuatable seal" when used in context of the preceding specification will be understood to refer to a seal which can act to transition itself between an operable state and an inoperable state. It will be understood that the act could comprise inflation and deflation of a sealing bladder, mechanical extension and retraction of a sealing lip, and the like.

The terms "comprise" and "include", and any variations thereof required for grammatical reasons, are to be considered as interchangeable and accorded the widest possible interpretation.

The invention is not limited to the embodiments hereinbefore described which may be varied in both construction and detail.

The invention claimed is:

1. A dock ramp assembly for a docking opening on a facility, the dock ramp assembly comprising:
a seal for sealing the docking opening with at least one access door opening on a transport vehicle when the transport vehicle is docked with the facility;
the seal comprising an upper seal which extends over a top peripheral edge of the docking opening and adjacent side peripheral edges of the docking opening and a lower seal which extends beneath a lower peripheral edge of the docking opening, such that the seal extends around the entire periphery of the docking opening and the seal is arranged to form a complete seal between the docking opening and the access door opening when the transport vehicle is docked with the facility;
wherein the dock ramp assembly further comprises a retractable bumper which is transitioned from an extended in-use position in front of the docking opening to a retracted stored position remote from the docking opening, wherein the lower seal is moveable vertically from a stored position remote from the docking opening into an in-use position in front of the lower peripheral edge of the docking opening when the retractable bumper is in its retracted stored position remote from the docking opening so as to allow the complete seal to be formed between the docking opening and the access door opening, and
wherein the lower seal is affixed to a moveable mounting plate which moves vertically from a stored position remote from the docking opening into an in-use position in front of the lower peripheral edge of the docking opening when the retractable bumper is in its retracted stored position remote from the docking opening.

2. A dock ramp assembly as claimed in claim 1, wherein the moveable mounting plate is held between a pair of substantially vertical guide rails which guide the moveable mounting plate vertically from its stored position remote from the docking opening into its in-use position in front of the lower peripheral edge of the docking opening, and the moveable mounting plate being vertically deflectable about its in-use position to accommodate height variations of the transport vehicle as the docked transport vehicle is loaded or unloaded with goods.

3. A dock ramp assembly as claimed in claim 1, wherein the upper seal is formed by a substantially horizontal linear top seal and a pair of linear side seals.

4. A dock ramp assembly as claimed in claim 3, wherein the pair of linear side seals are angled to extend upwardly and diagonally outwardly at an angle of between 10° and 30°.

5. A dock ramp assembly for a docking opening on a facility, the dock ramp assembly comprising:
a seal for sealing the docking opening with at least one access door opening on a transport vehicle when the transport vehicle is docked with the facility;
the seal comprising an upper seal which extends over a top peripheral edge of the docking opening and adjacent side peripheral edges of the docking opening and a lower seal which extends beneath a lower peripheral edge of the docking opening, such that the seal extends around the entire periphery of the docking opening and the seal is arranged to form a complete seal between the docking opening and the access door opening when the transport vehicle is docked with the facility;
wherein the dock ramp assembly further comprises a retractable bumper which is transitioned from an extended in-use position in front of the docking opening to a retracted stored position remote from the docking opening, wherein the lower seal is moveable vertically from a stored position remote from the docking opening into an in-use position in front of the lower peripheral edge of the docking opening when the retractable bumper is in its retracted stored position remote from the docking opening so as to allow the complete seal to be formed between the docking opening and the access door opening,
wherein a receiving cavity is created between the docking opening and the access door opening when the transport vehicle is docked with the facility;
wherein the seal is an actuatable seal having a retracted inoperable state and an extended operable state; and
the dock ramp assembly further comprising a pump to pressurise the receiving cavity to a preset level to check the integrity of the complete seal in its extended operable state.

6. A dock ramp assembly as claimed in claim 5, wherein the dock ramp assembly comprises a controlled hatch between the receiving cavity and an exterior of the dock ramp assembly, the controlled hatch being controllably opened to allow pressurised air to escape through the hatch and purge the receiving cavity of unwanted contaminants.

7. A dock ramp assembly as claimed in claim 5, wherein the dock ramp assembly comprises an anti-contaminant gas which is injected to the receiving cavity.

8. A dock ramp assembly as claimed in claim 7, wherein the anti-contaminant gas is injected into the receiving cavity using the pump, during pressurisation of the receiving cavity.

9. A dock ramp assembly for a docking opening on a facility, the dock ramp assembly comprising:
a seal for sealing the docking opening with at least one access door opening on a transport vehicle when the transport vehicle is docked with the docking opening;

the seal comprising an upper seal which extends over a top peripheral edge of the docking opening and adjacent side peripheral edges of the docking opening and a lower seal which extends beneath the lower peripheral edge of the docking opening, with the upper seal and lower seal acting to form a complete seal around a periphery of the docking opening;

wherein at least one of the lower seal and/or the upper seal are vertically moveable so as to allow the complete seal to be formed between the access door opening on the transport vehicle and the docking opening on the facility, wherein the dock ramp assembly further comprises a retractable bumper which is transitioned from an extended in-use position in front of the docking opening to a retracted stored position remote from the docking opening, wherein the lower seal is moveable vertically from a stored position remote from the docking opening into an in-use position in front of the lower peripheral edge of the docking opening when the retractable bumper is in its retracted stored position remote from the docking opening so as to allow the complete seal to be formed between the docking opening and the access door opening, wherein the lower seal is a lower substantially horizontal seal which is vertically moveable, and wherein the lower substantially horizontal seal is affixed to a moveable mounting plate which moves vertically from a stored position remote from the docking opening into an in-use position in front of the lower peripheral edge of the docking opening.

10. A dock ramp assembly as claimed in claim 9, wherein a receiving cavity is created between a facility door which closes the docking opening and a vehicle door which closes the access door opening on the transport vehicle when the transport vehicle is docked with the docking opening, the dock ramp assembly further comprising a pump to pressurise the receiving cavity to a preset level to check the integrity of the formed complete seal.

11. A dock ramp assembly as claimed in claim 10, wherein the dock ramp assembly comprises a controlled hatch between the receiving cavity and an exterior of the dock ramp assembly, the controlled hatch being controllably opened to allow pressurised air to escape through the hatch and purge the receiving cavity of unwanted contaminants.

12. A dock ramp assembly as claimed in claim 10, wherein the dock ramp assembly comprises an anti-contaminant gas which is injected to the receiving cavity.

13. A dock ramp assembly as claimed in claim 12, wherein the anti-contaminant gas is injected into the receiving cavity using the pump during pressurisation of the receiving cavity.

14. A dock ramp assembly as claimed in claim 9, wherein the moveable mounting plate is held between a pair of substantially vertical guide rails which guide the moveable mounting plate vertically from its stored position remote from the docking opening into its in-use position in front of the lower peripheral edge of the docking opening, and the moveable mounting plate is vertically deflectable about its in-use position to accommodate height variations of the transport vehicle as the docked transport vehicle is loaded or unloaded with goods.

* * * * *